Dec. 2, 1958     A. D. N. SCOTT     2,862,573
FILTER FOR AIR CIRCULATOR
Filed May 3, 1956
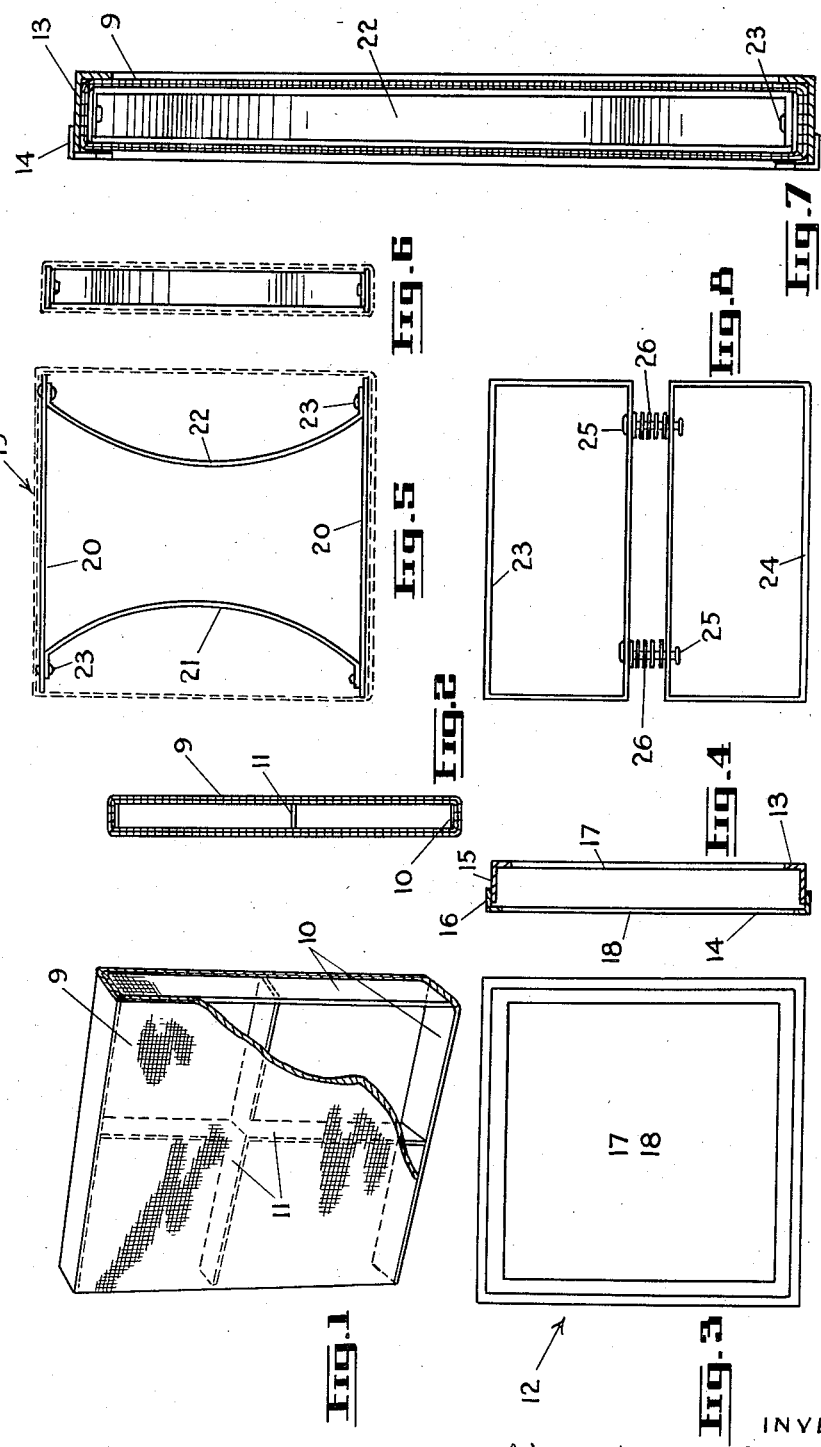
INVENTOR
Alexander D. N. Scott
Ralph Burch
Attorney

United States Patent Office 2,862,573
Patented Dec. 2, 1958

2,862,573

FILTER FOR AIR CIRCULATOR

Alexander Douglas Noel Scott, London, Ontario, Canada

Application May 3, 1956, Serial No. 582,541

3 Claims. (Cl. 183—70)

This invention relates to air filters for use in warm air furnace blowers and cooling systems, also air intakes on air compressors, and internal combustion engines.

Filters at present in use for air filtration are often difficult to clean and some have to be replaced when soiled. A soiled filter causes bad air circulation and inefficient heating or cooling. However, costly replacements or problems in cleaning deter owners from giving the proper and essential attention to their filter units so that efficient operation of their heating and cooling system is not maintained.

The object of the invention is to overcome the above disadvantages.

It is an object of this invention to provide a filter and frame wherein the filter is held in place in a novel manner and is readily removable for cleaning purposes.

A further object of this invention is to provide a filter and frame which is simple in construction, thoroughly reliable and efficient in its operation, strong, durable, and inexpensive to manufacture.

It is a further object of this invention to provide a filter and frame, wherein the filter may be thoroughly cleaned in an ordinary washing machine.

Other objects will be apparent from the following description of the invention when taken in conjunction with the accompanying drawings in which:

Figure 1 is a perspective view of the filter mounted around a framework;

Figure 2 is an end elevation of the embodiment shown in Fig. 1;

Figure 3 is a front elevation showing the outer framework assembly;

Figure 4 is a sectional end elevation of Fig. 3;

Figure 5 is a modification of the inner framework of the filter;

Figure 6 is an end elevation of Fig. 5;

Figure 7 is a sectional end elevation of Fig. 5 including the outer framework;

Figure 8 is a further modification of the inner framework of the filter.

Referring more particularly to the drawings wherein like parts are designated by like numerals of reference throughout the several views. Numeral 9 designates the filter which consists of several layers of cheese cloth or some other suitable textile fabric having desirable filtering characteristics. The several layers are made from a single length of material wound firmly around a framework 10. The framework 10 is fabricated into the desired rectangular shape from strips of metal or wood which are reinforced at their mid-points by cross members 11. An outer framework 12, shown in Figures 3 and 4, surrounds the outer edges of the filter to form a protection for the material and to provide a precise outer dimension to the unit. This outer framework may be constructed of two sheet metal stampings 13 and 14, having upturned sides 15 and 16 respectively. Openings 17, and 18, are cut out of the stampings leaving rectangular frames of L-shaped cross section. The sides 14 and 15 of the frames are adapted to overlap each other to form a container or outer framework for the filter.

When cleaning becomes necessary the filter and inner frame are removed from the outer framework 12. The filter material is then unwrapped from the inner frame 10 and is washed by hand or machine as desired.

Figures 5, 6, and 7, show a modification of the inner frame structure. In this embodiment the filter material is wound into the form of an endless band and is then stitched so that the different layers are fixed in relation to each other. The frame 19, consists of two strips of metal 20 of a length equal to the width of the filter band. These strips are joined by two flexible spring steel stays 21 and 22 which are secured thereto by rivets 23. The spring stays are such a length that they are caused to bow inwardly towards each other when assembled within the band. Thus an outward thrust on strips 20 holds the filter band in a tight rectangular shape. The filter is assembled within the outer framework as already described. The filter band may be removed by inserting the hand between the two sides of the band and drawing the stays 21 and 22 towards each other at their center. This will remove the tension and shorten the distance between the strips 20, allowing simple removal of the filter band from the frame. The filter may then be washed as a continuous band.

Figure 8, shows a further modification of the inner frame structure. The frame consists of two small rectangular frames 23 and 24. These frames are made from strip metal and have a length equal to the desired width of the filter. Two holes are drilled in one side of each frame to receive connecting bolts 25. Mounted on the bolts between the two drilled sides of the frame are two compression springs 26. These springs hold the two frames in spaced apart relation. The resulting frame is contracted by grasping the two inner sides of the frame and it is then inserted within the filter band. The springs are allowed to expand and cause the band to tighten into the desired shape.

While several embodiments of the invention have been illustrated and described herein, it will be understood that various changes and modifications may be made without departing from the spirit of the invention.

The embodiments of the invention in which an exclusive property or privilege is claimed are defined as follows.

I claim:

1. An air filter comprising an endless band of filter material, a frame insertable into the interior of the band to hold said band in rectangular shape, said frame being composed of a pair of end members extending the width of the material and compressible spring members between and connected to said end members for extending the end members lengthwise of the material in opposite directions to draw the material taut.

2. An air filter comprising an endless band of filter material, a frame insertable into the interior of the band to hold said band in rectangular shape, said frame being composed of a pair of end members extending the width of the material and a pair of spring steel stays extending between and connected to said end members for moving the end members lengthwise of the material in opposite directions to draw said material taut, said spring stays being bowed inwardly of the band so that when compressed together they retract said end members.

3. An air filter comprising an endless band of filter material, a frame insertable into the interior of the band to hold said band in rectangular shape, said frame being composed of two end sections extending the width of the material, bolts slidably connecting said sections together in spaced relation, and coil springs mounted on said bolts between the sides of said sections normally tending to move said sections apart lengthwise of the material and thereby draw said material taut.

References Cited in the file of this patent

UNITED STATES PATENTS 1,691,967  Gammeter _____ Nov. 20, 1928

FOREIGN PATENTS 695,574  Germany _____ Aug. 28, 1940
817,302  Germany _____ Oct. 15, 1951